Patented May 12, 1931

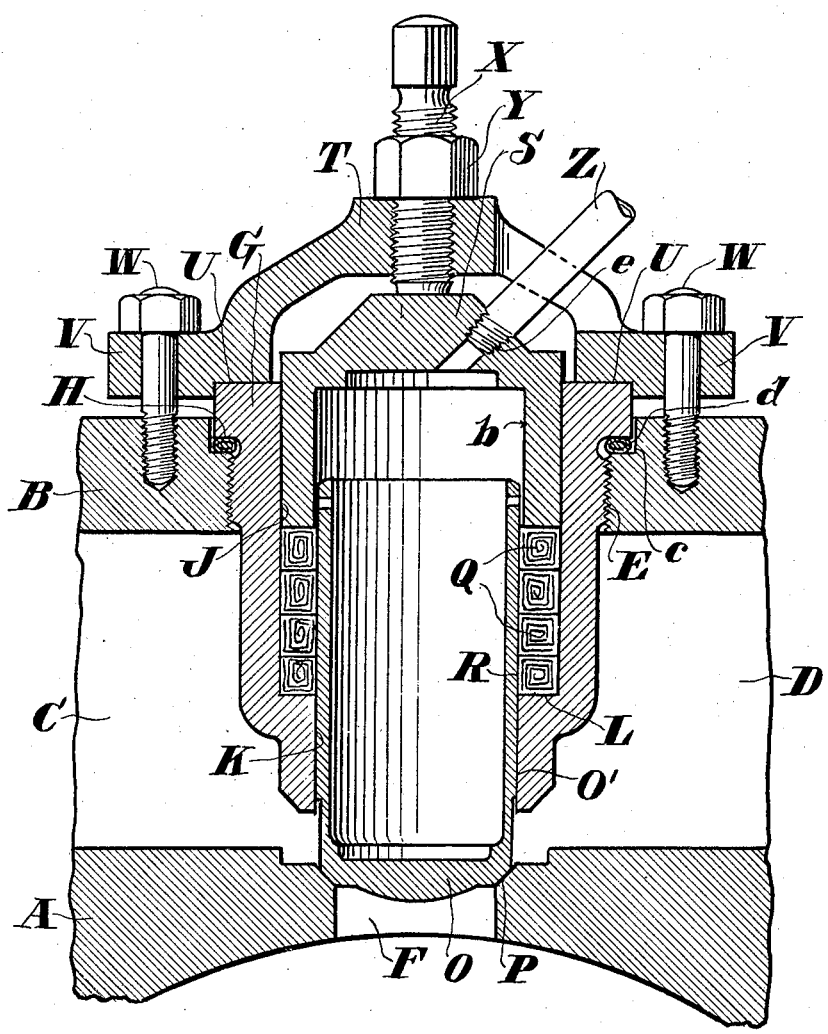

1,804,892

UNITED STATES PATENT OFFICE

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

CLEARANCE VALVE ASSEMBLY

Application filed October 22, 1927. Serial No. 227,971.

This invention relates to fluid compressors, but more particularly to a clearance valve for controlling the passage of fluid to clearance pockets provided at either end of the compressor cylinder, in order to regulate the load of a compressor at constant speed.

It is an object of this invention to produce a valve of simple construction, quiet in its action and cheap to construct wherein the packing about the valve may be easily adjusted from the outside of the compressor cylinder without removing any part of the valve.

Other objects will be in part obvious and in part pointed out hereinafter.

The drawing shows a vertical sectional view of the valve and part of the compressor cylinder to which the valve is attached.

Referring to the drawings, the inner and outer walls of a compressor cylinder are shown at A and B respectively and these walls form clearance pockets C and D. A threaded aperture E in the outer wall B is aligned with a smaller opening F in the inner wall A. Into the aperture E is screwed a valve guide G, formed so as to have a shoulder H near its outer end and large and small bores J and K respectively. The bores J and K form a shoulder L at their meeting point. A hollow cylindrical piston valve O normally seats on a valve seat P and is reciprocable in the bore K in the valve guide G. The exterior or guiding surface O' of the valve O is of substantially uniform diameter throughout the length of the valve, although, if desired, the unguided end of the valve may be slightly relieved. Packing Q is placed around the upper cylindrical part R of the valve O. This packing is held in place against the shoulder L by a hollow plug S which slidably fits the bore J. A spider T is seated at U on the valve guide and its arms V project outwardly from the guide. Bolts W are passed through the arms V and screwed into the outer cylinder walls B thus securing the spider T in place. A set screw X having a lock nut Y is centrally located in the spider so that its end bears against the plug S in such a manner that by screwing the set screw X downwardly the packing Q will be compressed and tightened around the valve stem surface R.

A pipe Z threaded into the plug S at $e$ is adapted to carry fluid pressure from a source of supply (not shown) to the chamber $b$ formed inside of the plug S. It will be noted here that the area of the valve exposed to receiver pressure carried by the pipe Z is larger than the area of the valve exposed to cylinder pressure. At the outer edge of the aperture E a recess $c$ is formed so that a ring of packing $d$ may be interposed between the cylinder wall and the shoulder H of the valve guide G for preventing leakage of air at this point.

In the operation of the device the force exerted on the larger outer end of the valve O tends to hold the valve onto its seat P, against variable pressure upon the inner smaller pressure area and this variable pressure changes with the stroke of the compressor and tends to open the valve. By this means the passage of fluid from the cylinder to the different clearance pockets is controlled in accordance with the load of the compressor at constant compressor speed.

I claim:

A clearance valve assembly comprising a cylindrical valve guide having a differential bore, a plug member slidable in the guide for closing said bore at its outer end and having a chamber to receive pressure fluid from a source, an aperture for the admission of pressure fluid from an external source into the chamber, a cylindrical clearance valve member of uniform diameter throughout its length reciprocable within said guide and having one unbroken guiding surface of uniform diameter, packing surrounding said valve member, and means cooperating with said plug for uniformly compressing said packing from the exterior of the valve assembly and comprising a stationary spider and one set screw adapted to be screwed against said plug member for compressing the packing.

In testimony whereof I have signed this specification.

FREDERICK W. PARSONS.